Nov. 26, 1940.  L. E. GEYER  2,222,765
SIGNAL DEVICE FOR VEHICLES
Filed March 2, 1937
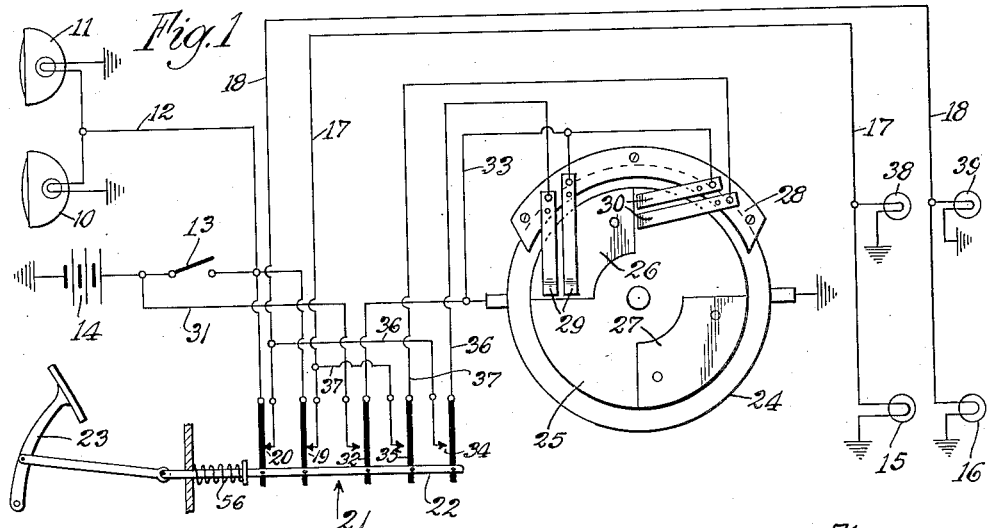
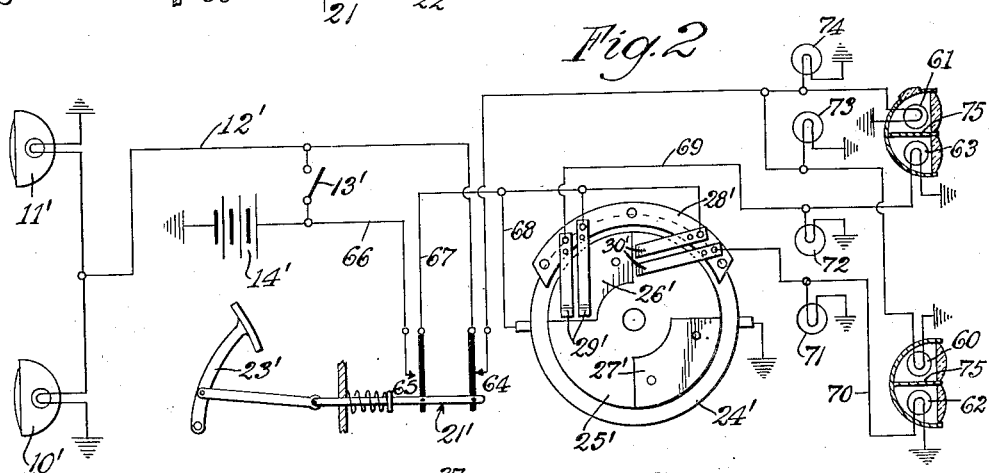
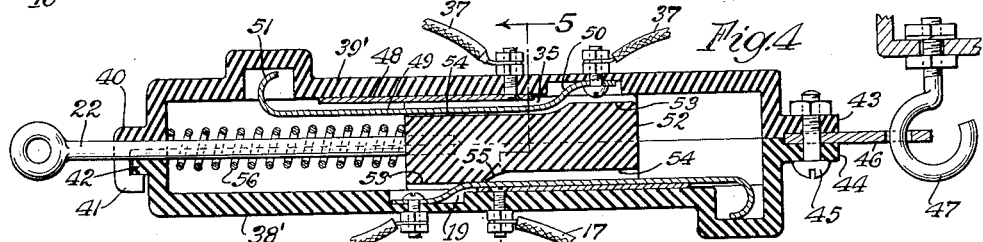
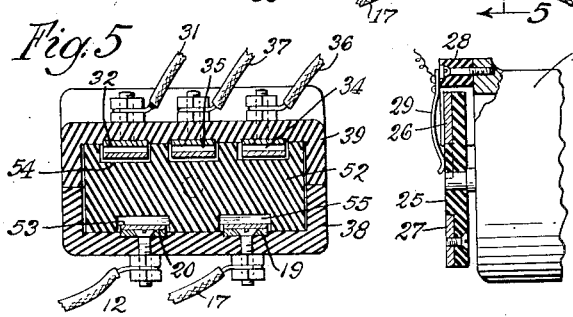
Inventor
Leon E. Geyer
by Geo. H. Back
Attorney.

Patented Nov. 26, 1940

2,222,765

UNITED STATES PATENT OFFICE 2,222,765

SIGNAL DEVICE FOR VEHICLES

Leon E. Geyer, Washington, D. C., assignor of seventeen and one-half per cent to George A. Brace, Chicago, Ill.

Application March 2, 1937, Serial No. 128,674

11 Claims. (Cl. 177—337)

This invention relates to signalling means applicable to vehicles, particularly of the motor driven type having means subject to the control of the driver for arresting the movement of the vehicle.

This application is a continuation in part of my copending application, Serial No. 657,437, filed February 18, 1933.

Various signalling devices have been proposed heretofore, all of which are subject to one or more serious deficiencies. For example, it is common practice at the present time to provide a vehicle such as a passenger automobile with both single and double tail lights which may be energized after dark to indicate the presence of the car to all persons to the rear. It is also common to place one or two similar red lights on the rear of the vehicle of greater intensity than the tail lights. These lights are generally termed stop-lights and are energized at the will of the driver, or simply by depressing the brake pedal. However, these constructions present several distinct disadvantages. First, of all, drivers to the rear of another vehicle cannot definitely ascertain whether the two red lights in front of them indicate one tail light and one stop-light, or merely dual tail lights. Therefore, the red signal lights on the vehicle are ineffective to inform other drivers as to whether the first vehicle is proceeding forward, or whether it is being slowed down or brought to a halt.

Moreover, if a driver does not see the stop-light of a car in front of him at the instant when it is energized, he is likely to assume that it is simply the tail light of another car.

The signalling systems now in use on motor vehicles are particularly inadequate in heavy traffic in which one driver may easily see the tail lights of a large number of other vehicles. Under such conditions it is highly desirable to inform all other drivers quickly and definitely of any one driver's intentions to stop or to slow down. Yet signalling systems heretofore developed are incapable of providing notice of this character in a reliable and facile manner.

It is therefore an object of my invention to provide a signalling system suitable for use on motor vehicles which will inform other drivers of another driver's intentions to stop with greater certainty than heretofore.

Another object of the invention is to provide a novel signalling system which will continue to remind other drivers of one driver's intentions to stop so long as the one driver is making an effort to stop. More specifically, it is an object of the invention to so interconnect the signalling and braking systems of a vehicle that the former is automatically placed into operation whenever the latter is.

Still another object of this invention is to provide means for flashing the lights on the rear of a vehicle alternately so long as and whenever any pressure is applied to the brakes to operate the same; thus indicating in a positive and distinctive manner to all other persons that the driver of the vehicle is about to stop or change his course.

Another object of the invention is to provide a signalling system for motor vehicles in which the current is restored to a predetermined one of the lights after the brakes are released in order that this light may illuminate the license plate of the vehicle. According to one embodiment of the invention this same light may be flashed when the brakes are being applied, while in a second embodiment this light remains extinguished whenever the brakes are being applied.

A further object of the invention is to provide a signalling system satisfying the above mentioned requirements which is simple, inexpensive, and applicable to vehicles now in use with a minimum number of alterations which can be readily made by a novice.

The nature of the invention and several modes of carrying the same into effect will be ascertained from the following description considered in conjunction with the accompanying drawing forming a part of this specification, of which:

Figure 1 is a schematic wiring diagram of a preferred form of the invention;

Figure 2 is a schematic wiring diagram of a modified embodiment of the invention;

Figure 3 is a fragmentary view of the motor actuated flashing switch showing the switch and mounting in vertical section;

Figure 4 is a longitudinal sectional view of the brake-operated multiple contact switch;

Figure 5 is a transverse sectional view along line 5—5 of the multiple contact switch.

The invention may be carried out by a few minor alterations in the lighting circuit of motor vehicles now in use. Thus, according to this invention a multiple contact switch may be operatively connected to the brake pedal or other braking elements in such manner as to energize a motor operated alternating switch controlling the current supply to two or more signal lights on the vehicle. If it is desired to employ the signal lights for other purposes when the alternating switch is not energized then the multiple contact switch can be so connected to the circuit as to render the operation of the signal lights independent of the first mentioned switch at such times, as will appear more fully hereinafter. As soon as the driver starts to apply the brakes, the multiple contact switch operates to energize the motor operated switch which in turn supplies current to first one of the signal lights and then to another at predetermined time intervals. The attention of other drivers is quickly obtained and held, and the fact that the driver of the first vehicle is about to modify his actions is forcibly impressed upon them. As soon as the first driver releases the brakes, the flashing lights are instantly restored to their previous condition.

I will now explain in detail a preferred mechanism for carrying out my invention, reference being had to Figure 1.

The usual head lights or driving lights 10 and 11 are connected through conductor 12 and a manual switch 13 to a source of power such as a battery 14. Signal lights 15 and 16 are preferably spaced apart at some location on the rear of the vehicle (not shown) and are normally connected to battery 14 through conductors 17 and 18, and normally closed switches 19 and 20, respectively. Switches 19 and 20 constitute two of the switches of multiple switch device 21, and are operatively associated with a common actuating means 22 which is connected to a part of the braking system such as the brake pedal 23.

The mechanism for alternately flashing signal lights 15 and 16 comprises a motor 24 connected through suitable speed reducing means, not shown, to a disc 25 of insulating material. The disc carries two or more metallic segments 26, 27, on its face. A segment 28 of insulating material is supported on the motor, as is more clearly shown in Figure 3, and supports two pairs of resilient contact members 29 and 30. If two metallic segments are employed, each should have a circumferential extent of 90°, and the pairs of contacts should be mounted 90° apart in such manner that one pair of contacts will always engage one of the metallic segments regardless of the position of rest of disc 25.

The supply of current to motor 24 is obtained through conductor 31 in which is located a switch 32. This switch also controls the supply of current through conductor 33 to one contact of the pairs of contacts 29 and 30. The remaining two switches 34 and 35 of multiple switch 21 are connected between the other contact of contact pairs 29 and 30 and conductors 17 and 18 leading to the signal lights 15 and 16, such connection being through conductors 36 and 37.

Small indicating lights 38 and 39 may also be energized through conductors 17 and 18. As shown, these lights are connected in parallel with signal lights 15 and 16, but it will be understood that the connection may be in series if desired. Indicating lights 38 and 39 should be located in view of the driver of the vehicle, as will be apparent from the schematic wiring diagram, these lights will respectively indicate the condition of signal lights 15 and 16 at all times. Thus a simple and positive means is provided for informing the driver as to whether or not the entire mechanism is functioning properly, and if not, then whether the normal rear light circuit or the flashing light circuit is at fault.

Multiple contact switch 21 may be constructed in any suitable manner. A particularly desirable form is shown in Figures 4 and 5. The housing comprises two interlocking members 38' and 39' of molded insulating material. Member 39 carries a lug 40 one end of which is slotted at 41 to receive the switch operating rod 22. The other casing member 38' also has a lug 42 which interlocks with lug 40 in such manner as to secure the casing members together. Similar lugs 43 and 44 at the opposite ends of the casing members are provided with an opening for a bolt 45 to hold the casing members together. A strip of metal 46 is secured to the casing by bolt 45 and is preferably the sole means of mounting the switch to the vehicle, as by the open eye bolt 47. It is therefore clear that the switch is free to move in all directions about eye bolt 47.

As many individual switches or circuit breakers as are necessary may be mounted within the casing. In the form shown, three switches are mounted in the upper part of the casing, and two switches are in the lower part. Each switch consists of an elongated stationary blade 48 partially embedded in the casing member, and a second blade 49 of resilient material secured to the casing and normally in closely spaced, parallel relation with the stationary blade. The fixed end of blade 49 is located in a depression in the casing and has a rounded shoulder 50 for a purpose to be described. The other end of the blade may be provided with a rounded resilient end 51 formed to coact with an adjacent portion of the casing in a manner to maintain blades 48 and 49 apart when the switch operating means is in inoperative position.

All the switches may be formed as just described, but in order that certain switches may open as others are about to close it is desirable that one set of switches be in the upper casing member and one set in the lower casing member, and that the two sets extend in opposite directions as clearly illustrated in Figure 4. When so positioned a single plunger or switch operating means 52 may be located between the two sets of switches and provided with grooves and shoulders in such a manner as to operate the switches in any desired sequence by simply moving the plunger longitudinally of the casing. To this end, plunger 52 has shallow grooves 53 opening into deep grooves 54. A cam surface 55 joins the two grooves. These grooves overlie each switch. When the plunger is so positioned that the entire blade 49 of a switch can move into a keep groove, that switch will open and remain open until cam surface 55 comes into contact with shoulder 50 on the switch blade. Further movement of the plunger will depress the blade and bring it into contact with blade 48 thus closing the switch. The plunger can then continue to move in the same direction without straining any of the switches and without danger of opening switches which have been closed.

A rod 22 is secured to the plunger and extends through the casing for attachment to the brake pedal. A coil expansion spring 56 tends to maintain the plunger in the right hand end of the casing, as viewed in Figure 4, in which position the switches in the lower part of the casing are closed, and those in the upper part of the casing are open, as will be seen in Figure 4.

The mode of operation of the preferred form of the invention is as follows: As soon as the driver depresses the brake 23 ever so little, multiple switch 21 will be operated, and switches 19 and 20 will be opened and switches 32, 34 and 35 will be closed. Motor 24 will be energized as soon as switch 32 closes. As soon as switches 34 and 35 close one of the signal lights 15 and 16 will be lighted and the corresponding indicating light 38 or 39 will also light. This is true regardless of whether motor 24 is operating or not since one set of contacts 29 and 30 always remains in contact with one or the other of the metallic segments 26 and 27. When the motor does start in response to the closing of switch 32, it will be apparent that current is alternately supplied to signal light 15 and then to signal light 16. So long as any pressure is applied to the brake the signal lights will continue to flash in a uniform and steady manner which cannot fail to attract and hold the attention of other drivers. But when the brake is released the signal lights cease to flash and are subject to the control of the driver by means of manual switch 13. Hence, during the day time, switch 13 will be open and the signal lights will not be lighted, but during the night time, switch 13 will be closed. Under the latter circumstances both of the signal lights will be energized and will remain lighted so long as the brake is not depressed.

It will therefore be seen that according to the preferred form of the invention I have provided a signal system in which dual tail lights may be energized or not as the driver desires by opening or closing switch 13. Whenever the brake is depressed, and regardless of the position of switch 13, these same tail lights are instantly converted into alternately flashing signal lights. Indicating lights are also provided near the operator by my invention, which will inform him of the condition of the signal lights at all times.

Another form which my invention may take is illustrated in Figure 2. In this embodiment of the invention dual tail lights 60 and 61 are provided which are under the control of manual switch 13'. A duplicate set of lights, 62 and 63, is also provided which lights may be located in the same casings as the tail lights in accordance with known practice. These latter lights are connected to a multiple switch 21' and a motor driven flasher 24' so as to be alternately flashed whenever the brakes are operated much in the same manner as just described in connection with the preferred form.

In this form of the invention multiple switch 21' consists of a normally closed switch 64 and a normally open switch 65. When brake 23' is depressed switch 64 opens and switch 65 closes. Power is therefore supplied from battery 14' through conductors 66, 67, 68, and switch 65 to motor 24', as well as to one of the contacts in each set of contacts 29' and 30'. At the same time current will be supplied to one of the flashing stop-lights depending upon which set of contacts 29' and 30' is bridged by one of the metallic segments 26' and 27' on the rotating insulating disc 25'. If set 29' is bridged, current will be supplied to stop light 63 through conductor 69; and if set 30' is bridged, current will be supplied to stop-light 62 through conductor 70. When motor 24' starts, stop-lights 62 and 63 will be alternately flashed as the brake is depressed in the same manner as previously described in connection with Figure 1.

The usual head-lights 10' and 11', as well as the conventional dual tail lights, may be simultaneously controlled at the will of the driver by means of manual switch 13', as will be evident from Figure 2. However, in order that the attention of other drivers may be more completely focused on the flashing stop-lights, it will be noted that whenever the brake is depressed, switch 64 is opened thus de-energizing the dual tail lights 60 and 61. Switch 64 may be omitted if desired, and in this event the tail lights are entirely independent of the means for flashing the stop-lights.

Attention is called to indicating lights 71, 72, 73 and 74 which are similar in function and purpose to lights 38 and 39 in Figure 1. These lights are located near the driver and may be connected either in series or parallel with the tail and stop lights.

Switch 21' may be, and preferably is constructed in a manner similar to that shown in Figures 4 and 5 although it is apparent that any suitable type of multiple switch can be employed.

The signal lights of Figure 2 may be positioned at spaced points in the rear of the vehicle, it being understood that a tail light and a stop light are located in each casing and that an opaque partition 75 separates the two lights.

It will be appreciated that my invention is susceptible of being carried out in various ways other than those hereinabove specifically described. For example, the multiple switch device may be constructed in numerous ways which will suggest themselves to those skilled in the art, and if desired, the flashing device and its driving motor may be housed within the multiple switch casing. In this event it is only necessary to mount a single casing on the vehicle and to connect it to the brake mechanism and the wiring system of the vehicle, all of which is a very simple operation.

I claim:

1. In combination with the storage battery of a motor vehicle, a plurality of signal lights including a plurality of normally constantly burning tail lights for night driving, and electrically actuated means subject to energization by the application of the vehicle's brake operating means for interrupting the current to said tail lights and for alternately flashing certain of said signal lights as long as any pressure is being applied to said operating means, and also operable upon release of the operating means to restore the current to at least a predetermined one of said tail lights.

2. In combination with the battery of a motor vehicle, a plurality of spaced apart signal lights on the rear of the vehicle, and means actuated by the brake operating means of the vehicle for alternately flashing at least certain of said lights as long as pressure is applied to said operating means and for restoring the current supply to at least two of said lights when the operating means is released.

3. In combination with the battery of a motor vehicle, a plurality of spaced apart lights on the rear of the vehicle, means, including an electrically controlled circuit breaker, adapted to be actuated by the brake operating means of the vehicle for alternately flashing certain of said lights as long as pressure is applied to said operating means and for restoring the current supply to at least a predetermined one of said lights when the operating means is released, and means independent of said electrically controlled circuit breaker for controlling the current supply to said predetermined ones of said lights.

4. That improvement in the art of signalling as applied to vehicles having brake operating means and a plurality of signalling lights which comprises interrupting the normal current supply to more than one of said lights upon the application of said operating means and thereafter alternately flashing more than one of said last mentioned lights as long as pressure is applied to said operating means, and finally restoring the normal current supply to said lights.

5. That improvement in the art of signalling as applied to vehicles of the type having brake operating means under the control of an operator and a plurality of signalling lights, which comprises interrupting the normal current supply to at least two of said lights and alternately flashing said last mentioned lights whenever and as long as pressure is being applied to said operating means and simultaneously restoring the current supply to each of said last mentioned lights upon release of the brake operating means.

6. That improvement in the art of signalling in connection with vehicles of the type having brake control means and a plurality of normally burning tail lights and a plurality of stop lights adapted to be energized whenever it is desired to slow the vehicle down, which improvement comprises interrupting the supply of current to said tail lights and alternately flashing said stop lights whenever and as long as pressure is being applied to said control means, and thereafter restoring the current supply to said tail lights and simultaneously interrupting the current supply to said stop lights.

7. In combination, a vehicle of the type having brake control means and a lighting system including a plurality of rearwardly positioned signal lights, a multiple contact switch operatively connected with operating means for said control means, means operate to actuate at least certain of said contacts simultaneously, some of said contacts being closed while others are open, a motor driven circuit breaker, said lighting system, multiple switch and circuit breaker being so connected in circuit that when the brake control means is in one position said signal lights may be energized at the will of the operator, and when the brake control means is in another position, at least certain of said signal lights will be subject to energization by said motor driven circuit breaker.

8. In combination, a vehicle of the type having brake control means and a lighting system including a plurality of signal lights, a multiple contact switch operatively connected with operating means for said control, said switch being constructed to permit a considerable movement of the operating parts after the making or breaking of contacts without unduly stressing said contacts or interfering with certain relative positions of the contacts, and a motor driven circuit breaker, said lighting system, multiple switch, and motor driven circuit breaker being so connected in circuit that an application of the control means interrupts the normal current supply to more than one of said signal lights and thereafter supplies current to first one of said last mentioned lights and then to another, and, upon the release of said control restores the normal current supply to said signal lights.

9. In combination, a vehicle of the type having brake control means and a lighting system including a plurality of stop lights and a tail light, a multiple switch having a normally open switch and a normally closed switch, means inter-connecting said switches and the operating means for said control means operable to reverse the normal positions of said switches upon movement of the control means, circuit means normally connected to supply current to said tail light at the will of the operator, circuit means including a motor driven circuit breaker connected to said stop lights, said multiple switch being so connected to said circuits as to interrupt the normal supply of current to the tail light and to energize said circuit breaker only whenever and as long as pressure is applied to said control means, whereby said tail light is not energized and said stop lights are periodically energized whenever the brakes of the vehicle are applied.

10. In combination with a vehicle having brake control means, a lighting system including a plurality of rear signal lights, means for energizing said lighting system at the will of the operator, said combination being characterized by the provision of means operable simultaneously with the application of operating force to the brake control means for disrupting the normal circuit to certain of said signal lights and for alternately flashing at least two of said lights as long as pressure is applied to said control and thereafter restoring said normal circuit.

11. In combination with a vehicle having brake operating means and a lighting system, said system having a plurality of rear signal lights, means subject to the operation of the brake operating means for alternately flashing at least two of said signal lights, and means normally controllable to energize certain of said signal lights independently of said flashing means but connected thereto so as to be rendered ineffective only while said flashing means is operating.

LEON E. GEYER.